(12) United States Patent
Pegg (10) Patent No.: US 9,395,696 B2
(45) Date of Patent: Jul. 19, 2016

(54) MULTI-PURPOSE INTERFACE FOR A PORTABLE ELECTRONIC DEVICE

(71) Applicant: BlackBerry Limited, Waterloo (CA)

(72) Inventor: Albert Murray Pegg, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 475 days.

(21) Appl. No.: 13/771,683

(22) Filed: Feb. 20, 2013

(65) Prior Publication Data

US 2014/0232328 A1    Aug. 21, 2014

(51) Int. Cl.
*H02J 7/00* (2006.01)
*G04C 10/00* (2006.01)
*H02J 5/00* (2016.01)
*H02J 7/02* (2016.01)
*G04G 17/08* (2006.01)
*G04G 21/04* (2013.01)

(52) U.S. Cl.
CPC .............. *G04C 10/00* (2013.01); *G04G 17/083* (2013.01); *G04G 21/04* (2013.01); *H02J 5/005* (2013.01); *H02J 7/0044* (2013.01); *H02J 7/025* (2013.01)

(58) Field of Classification Search
USPC ........................................................ 320/108
See application file for complete search history.

(56) References Cited

U.S. PATENT DOCUMENTS

| 7,618,260 B2 * | 11/2009 | Daniel et al. ..................... 439/37 |
| 2009/0280861 A1 * | 11/2009 | Khan .......................... 455/556.1 |
| 2011/0059769 A1 * | 3/2011 | Brunolli ...................... 455/556.1 |
| 2012/0194976 A1 * | 8/2012 | Golko et al. ............. 361/679.01 |
| 2013/0143519 A1 * | 6/2013 | Doezema ..................... 455/404.2 |
| 2014/0085815 A1 * | 3/2014 | Filipovic et al. ......... 361/679.56 |
| 2014/0210405 A1 * | 7/2014 | Yang ............................. 320/108 |
| 2014/0335490 A1 * | 11/2014 | Baarman et al. .............. 434/236 |
| 2015/0065893 A1 * | 3/2015 | Ye ................................. 600/483 |

FOREIGN PATENT DOCUMENTS

EP    1225751 A2    7/2002

OTHER PUBLICATIONS powerstrap™; retrieved on Feb. 20, 2013; retrieved from the internet at http://www.powerstrap.co.uk.
European Search Report for Application No. 13156033.6 dated Jul. 24, 2013; 6 pages.
European Examination Report; Application No. 13156033.6; Feb. 3, 2016; 5 pages.

\* cited by examiner

*Primary Examiner* — Mohammed Alam
(74) *Attorney, Agent, or Firm* — Conley Rose, P.C.; J. Robert Brown, Jr.

(57) ABSTRACT

A multi-purpose band for use with a portable electronic device comprises a base link, an interface link, and a coupling link. The base link is joined to the interface link by an interface support hinge, and the coupling link is joined among the base link, and the interface link. The multi-purpose band is configured to be arranged in a band configuration for wearing on a wrist or ankle of a user and in a stand configuration for supporting a portable electronic device at a support angle. The interface link defines an interface surface. A charging feature may be disposed on the interface link proximate the interface surface, wherein the charging feature is configured to facilitate establishing a charging relationship between the charging feature and an electrical connector of the portable electronic device to facilitate engagement between the charging feature and the electrical connector.

20 Claims, 4 Drawing Sheets

*FIG. 7*

MULTI-PURPOSE INTERFACE FOR A PORTABLE ELECTRONIC DEVICE

BACKGROUND

The present disclosure relates to bands for wearing around an ankle or a wrist. The present disclosure also relates to stands for portable electronic devices that may support a portable electronic device in a desired orientation for viewing, that may provide for wireless charging of a portable electronic device and for exchanging information with a portable electronic device. The present disclosure therefore relates to a multi-purpose charging interface for a portable electronic device, the charging interface being wearable on a user as a wristwatch or bracelet or anklet.

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart-phones, wireless personal digital assistants (PDAs), tablet computers, and laptop computers with wireless 802.11 or Bluetooth capabilities.

In today's world, a plethora of auxiliary devices have been developed to enhance a user's experience in using portable electronic devices. For example, a user may use a portable charging device for recharging a portable electronic device or may use an external speaker in connection with their portable electronic device. The user may employ an external interface for transferring information to or from the portable electronic device and may also employ an external display for viewing information transmitted from the portable electronic device. A stand or docking station may provide a convenient receptacle for an electronic device while coupling to a power source for charging a battery of the portable electronic device. Such stands may also provide an interface for data transfer between the portable electronic devices and, for example, a computer.

Unfortunately, it can be inconvenient to reliably transport or locate such auxiliary devices when or where their use is desired.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Described herein is multi-purpose band for use with a portable electronic device. The multi-purpose band is configured to be arranged in at least two distinct configurations. When in what will be called a "band configuration," the multi-purpose band is configured for wearing on a wrist or ankle of a user. When in what will be called a "stand configuration" (which may also be called a "charging-stand configuration"), the multi-purpose band is configured for supporting a portable electronic device at a support angle. In this disclosure, elements may be described as "configured to" perform one or more functions (or "configured for" functions or "configured so" they may perform functions). In general, an element that is configured to perform a function is suitable for performing the function, or is adapted to perform the function, or is operable to perform the function, or is otherwise capable of performing the function.

It should be understood at the outset that, although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Words such as "substantial" or "generally," as used herein, are intended to be descriptive but to avoid strict application or strict mathematical definition. To illustrate: two surfaces that are "substantially parallel" may be strictly parallel or approximately parallel; a shape that is "substantially a parallelogram" may be approximately a parallelogram, although it may not be exactly a parallelogram and although it may have rounded corners, for example; and "generally perpendicularly" includes but is not limited to precisely perpendicularly. The absence of any words that expressly avoid strict application or definition (in the detailed description and in the claims), however, does not necessarily mean that strictness is intended.

The multi-purpose band described herein may be utilized with a variety of portable electronic devices including various components. In some embodiments, for example, the band may include electrical components or moving parts, and may perform functions in addition to serving as a band and/or a stand. In other embodiments, however, the band may not serve as a stand (that is, it may not serve to support a portable electronic device), but, instead, may serve in a role not necessarily related to use as a band or as a stand for a portable electronic device.

As briefly mentioned above, disadvantages may be associated with a proliferation of auxiliary devices for use with a portable electronic device. It may be cumbersome and inconvenient, for example, to locate and connect an auxiliary component or device into a functioning assembly. When travelling from one location to another, components may have been misplaced, may be stored in an inaccessible location (e.g., checked baggage), or may have been simply forgotten or otherwise left behind. In some cases, it may be desirable to integrate a number of functions (e.g., camera and cell phone)

within a single package. Yet, for practical reasons (e.g., weight and size), it may not be desirable to integrate all auxiliary devices (e.g., a charging-stand, a remote display, an auxiliary power storage device, an information relay station) into a portable electronic device.

Some portable electronic devices, such as smart telephones (smart-phones) and tablet computers, may be handheld for ease of use and portability. That is, handheld devices are sized and shaped to be held or carried in a human hand and may be used while held. Many portable electronic devices include orientation sensing devices, such as an accelerometer, to detect an orientation of the device and display information in a corresponding orientation. Portable electronic devices are commonly used in an orientation that is dependent on the application running on the device. Further, individual users may prefer to use a portable electronic device in one orientation for one purpose and in a different orientation for a different purpose. A stand that facilitates movement of the portable electronic device into different orientations is desirable to improve ease of use of the portable electronic device for ease of display to the user, during charging and/or during data transfer.

Figure 1:
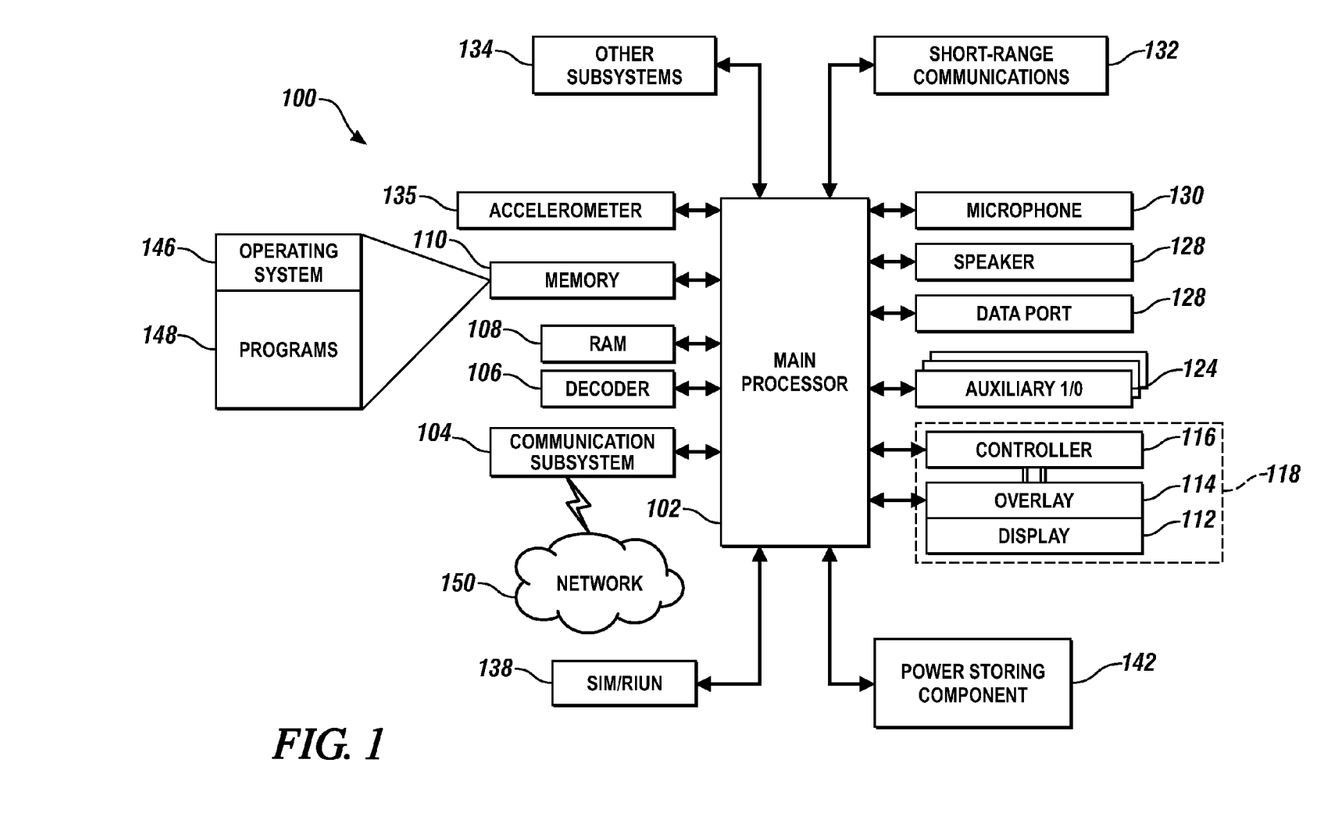
FIG. 1 is a block diagram of an example of a portable electronic device.

A block diagram of an example of a portable electronic device 100 is shown in FIG. 1. The portable electronic device 100 includes multiple components, such as a processor 102 that controls the overall operation of the portable electronic device 100. Examples of portable electronic devices 100 include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, or portable speakers. The portable electronic device 100 may also be a device without wireless communication capabilities, such as a handheld electronic game, digital photograph album, digital camera, media player, or e-book reader.

Communication functions, including data and voice communications, are performed through a communication subsystem 104, which may be configured for wirelessly communicating with the portable electronic device 100 and may include a wireless transmitter and receiver. Data received by the portable electronic device 100 is decompressed and decrypted by a decoder 106. The communication subsystem 104 receives messages from, and sends messages to, a wireless network 150. The wireless network 150 may be any type of wireless network, including, but not limited to, data wireless networks, voice wireless networks, and networks that support both voice and data communications. A power storing component 142, functioning as a power source for the portable electronic device 100, such as one or more rechargeable batteries, powers the portable electronic device 100. The portable electronic device 100 may also include charging circuitry (not shown), such as an inductive coil and a power controller, that may enable the power storing component 142 to be recharged wirelessly or through a physical electrical connection or both. As will be discussed below, some embodiments of a band may be used to deliver power to, or recharge a battery in, the portable electronic device 100.

The processor 102 interacts with other components, such as a Random Access Memory (RAM) 108, memory 110, a touch-sensitive display 118, one or more actuators, one or more force sensors, an auxiliary input/output (I/O) subsystem 124, a data port 126, a speaker 128, a microphone 130, short-range communications 132, and other device subsystems 134. The touch-sensitive display 118 includes a display 112 and an overlay 114 comprising one or more touch sensors that are coupled to at least one controller 116 that is utilized to interact with the processor 102. Input via a graphical user interface is typically provided via the touch-sensitive display 118. Information, such as text, characters, symbols, images, icons, and other items that may be displayed or rendered on the portable electronic device 100, is displayed on the touch-sensitive display 118 via the processor 102. The processor 102 may also interact with an orientation sensor, such as an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications 132, or any other device subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes one or more capacitive touch sensors that the overlay 114 comprises. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

Figure 2:
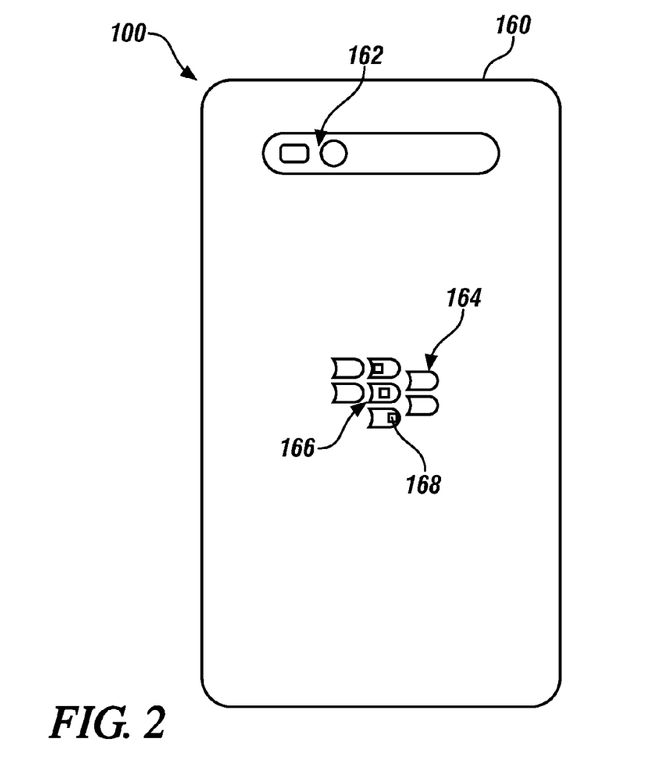
FIG. 2 is another view of an example of a portable electronic device.

Referring now to FIG. 2, the portable electronic device 100 includes a rear surface 160 that may comprise one or more features disposed on the rear surface 160 and/or recessed within the rear surface 160. Such features may include a digital camera arrangement 162 and a graphical element 164, which may comprise a logo, a registered trademark or any text, symbol or combination thereof that is associated with the portable electronic device 100. Regardless of the features disposed on or recessed within the rear surface 160, at least one, but typically a plurality, of electrical connectors 166 are integrated proximate the rear surface 160. As with the other features of the rear surface 160, it is contemplated that an electrical connector 166 extends outwardly away from the rear surface 160 in the form of protrusions.

Alternatively, one or more electrical connector 166 may be integrated as recessed regions within the rear surface 160. It is further contemplated that the plurality of electrical connectors 166 comprises a combination of protrusions and recesses. In yet another embodiment, the plurality of electrical connectors 166 may form a flush overall surface with the rear surface 160. Furthermore, the plurality of electrical connectors 166 may be arranged in numerous alignments, such as a relatively vertically aligned arrangement, however, it is to be appreciated that the plurality of electrical connectors 166 may be aligned in a relatively horizontal arrangement, an angled arrangement, a non-linear arrangement and/or a clustered arrangement. The preceding list of arrangements is merely illustrative of exemplary embodiments and is not intended to be limiting of the particular arrangement of the plurality of electrical connectors 166.

At least one of the plurality of electrical connectors 166 is formed of a magnetic material. Each of the plurality of electrical connectors 166 includes an outer portion 168, which is typically visible from an exterior location of the rear surface 160, as illustrated, where the outer portion 168 is accessible from an exterior location of the rear surface 160. Each of the plurality of electrical connectors 166 also includes an inner portion, which communicates with internal components of the portable electronic device 100, such as the power storing component 142, for example. The communication between the inner portion of each of the plurality of electrical connectors 166 and the power storing component 142 occurs through discrete contacts, selective plating, printed circuit boards (PCBs), wires or any other suitable manner of communication recognized in the art.

Although it is contemplated that the plurality of electrical connectors 166 may be disposed at various locations proximate the rear surface 160, in the exemplary embodiment shown, the plurality of electrical connectors 166 are disposed within the graphical element 164.

Figure 3:
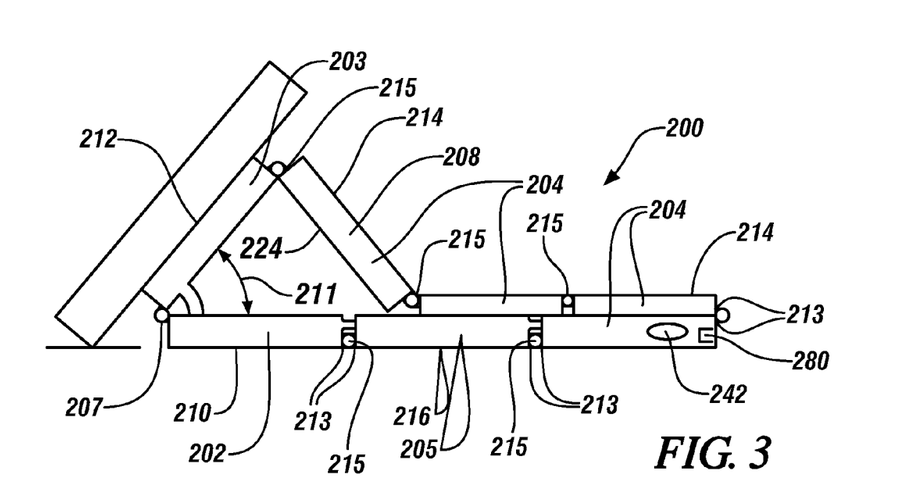
FIG. 3 illustrates an exemplary multi-purpose band in a stand configuration.
Figure 4:
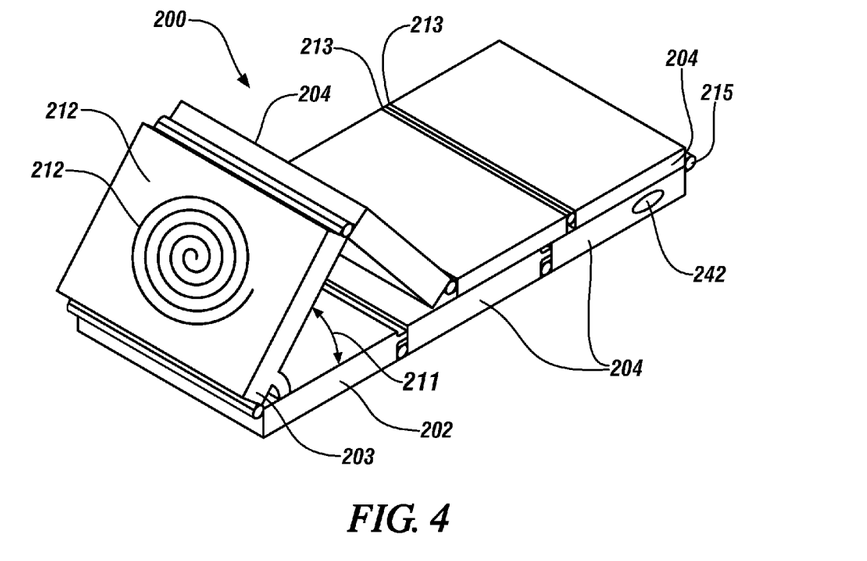
FIG. 4 illustrates an exemplary multi-purpose band in a stand configuration.

Referring now to FIG. 3 and FIG. 4, a multi-purpose band 200 is shown in a stand configuration. The multi-purpose band 200 includes a base link 202, an interface link 203, a stabilizer link 205, and one or more coupling link 204 disposed among the base link 202, an interface link 203, and stabilizer link 205. In an exemplary embodiment, the base link 202 is joined to the interface link 203 by an interface support hinge 207. (In general, components are "joined" when they are physically coupled to one another, or when they are attached or connected to one another in any fashion, whether releasably or substantially permanently, so that physical activity of one component generally affects the other. According to context, components may be joined directly to one another or by way of one or more intermediate elements.) The interface support hinge 207 is configured to facilitate supporting a portable electronic device 100 in a desired orientation when the multi-purpose band 200 is in a stand configuration. More specifically, the interface support hinge 207 may be configured so that the interface support hinge 207 defines a support angle 211 between the base link 202 and the interface link 203. In accordance with this embodiment, support for the interface link 203, and therefore the interface link 203, is provided, by a combination of the interface support hinge 207 and the base link 202.

As previously mentioned, the phrases "configured for" and "configured to" refer to a condition of an element or feature wherein the element or feature is capable of performing the designated function. An element may be configured to perform a function even if the element or feature does not necessarily perform the designated function at all times. For example, it should be appreciated from the foregoing description of the interface support hinge 207, that the interface support hinge 207 is capable of facilitate supporting a portable electronic device 100 in a desired orientation when the multi-purpose band 200 is in a stand configuration. Moreover, it should be appreciated that the interface support hinge 207 is capable of facilitating supporting a portable electronic device 100 in a desired orientation when the multi-purpose band 200 is in a stand configuration—even if the interface support hinge 207 does not necessarily do so at all times.

In an alternative embodiment, the support angle 211 may be defined by an orientation of a coupling link 204 when the multi-purpose band 200 is in a stand configuration. In accordance with this embodiment, the interface link 203 is supported by the coupling link 204, which is placed in compression, and the coupling link 204 serves as a kickstand 208 to the interface link 203. Accordingly, this embodiment does not require the interface link 203 to be supported by an interface support hinge 207.

Figure 5:
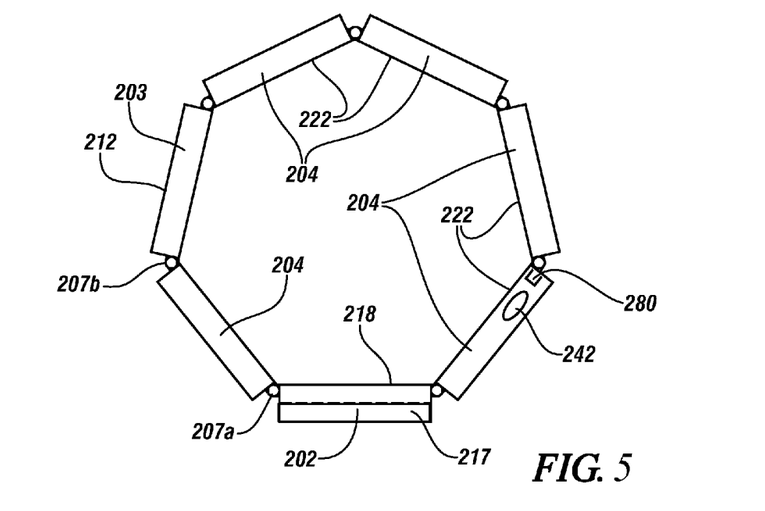
FIG. 5 illustrates a multi-purpose band arranged in a band configuration for wearing on a wrist or ankle of a user.
Figure 6:
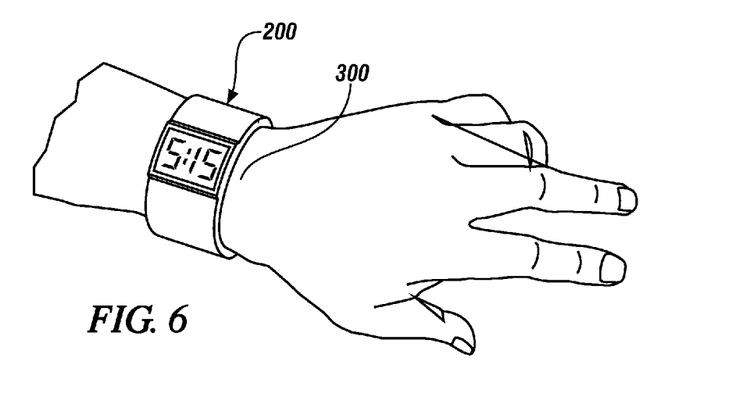
FIG. 6 illustrates a multi-purpose band arranged in a band configuration for wearing on a wrist or ankle of a user.

As shown in FIG. 5 and FIG. 6, in an exemplary embodiment, the multi-purpose band 200 may also be arranged in a band configuration for wearing on a wrist 300 of a user. To facilitate re-arrangement from a stand configuration (as shown in FIG. 3 and FIG. 4) to a band configuration (as shown in FIG. 5 and FIG. 6) and/or from a band configuration to a stand configuration, each of the links of the multi-purpose band 200 (i.e., the base link 202, interface link 203, stabilizer link 205, and one or more coupling links 204) are joined to one another at respective edges 213 by a hinged connector 215. Put another way, each of the base link 202, the interface link 203, the stabilizer link 205 and the coupling link 204 defines two edges 213 that are each joined, by a hinged connector 215, to an edge 213 of another base link 202, interface link 203, stabilizer link 205 or coupling link 204. Each hinged connector 215 is configured to facilitate a range of relative orientations of (i.e., angles between) adjacent links (consisting of one or more links selected from the group consisting of a base link 202, interface link 203, coupling link 204, and stabilizer link 205) so as to accommodate both a band configuration and a stand configuration. More specifically, in accordance with the embodiment shown in FIG. 5, hinged connector 215 is configured to facilitate an angle of between approximately 100 degrees and 150 degrees between its associated links (i.e., the base link 202 and the interface link 203). As a result, the multi-purpose band 200 may be re-arranged from a band configuration to a stand configuration.

Figure 7:
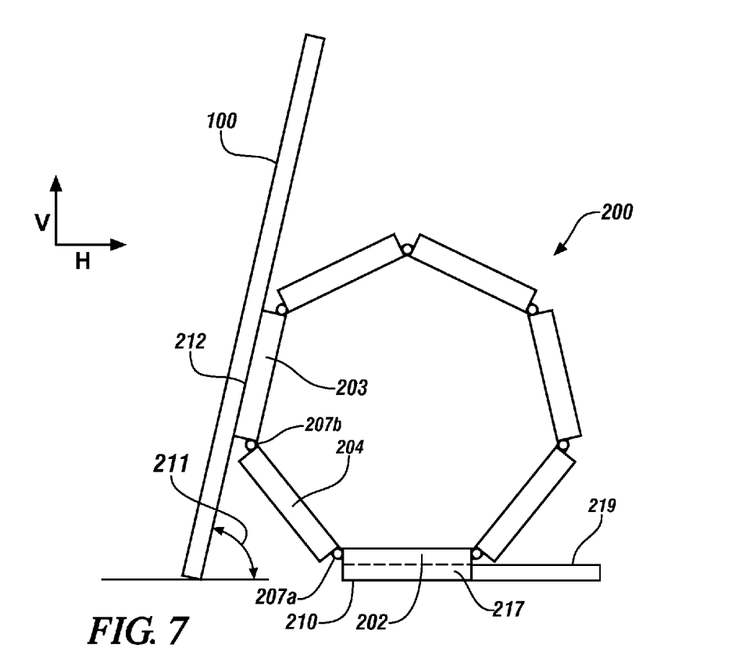
FIG. 7 illustrates a multi-purpose band in a stand configuration.

In an exemplary embodiment, as shown in FIG. 7, the support angle 211 may be defined by a combination of two or more interface support hinges 207. In the embodiment shown in FIG. 7, a base link 202 is joined to a coupling link 204 by a first interface support hinge 207a. The coupling link 204 is joined to the interface link 203 by second interface support hinge 207b. The first interface support hinge 207a and the second interface support hinge 207b, together, define the support angle 211, at which the portable electronic device 100 is positioned. In accordance with this embodiment, when the multi-purpose band 200 is in a stand configuration, a stabilizer 219 is deployed so as to extend from the base link 202 in a direction substantially parallel to the base link 202. The stabilizer 219 may be configured to be retracted (i.e., to occupy a retracted position) when the multi-purpose band 200 is in a band configuration. For example, the stabilizer 219 may be configured to slide into a cavity 217 defined the base link 202 or to rotate to a retracted position aligned with, and along a side of, the base link 202.

It should be appreciated that a desired orientation of the interface link 203 may be leaning at a support angle 211 that is deviated from vertical V. For example, one desirable angle is approximately thirty degrees from vertical V, which enables the portable electronic device 100 to be supported at a convenient viewing angle that is also stable. Other orientations are possible, including between approximately zero degrees from vertical to approximately only about fifteen degrees from horizontal H. Another exemplary orientation is approximately 45 degrees. Accordingly the precise range of angles accommodated by the support hinges 207 may vary, but generally combine to define a desired support angle 211.

Each of the links (i.e., the base link 202, the interface link 203, the one or more coupling links 204, and the stabilizer link 205) includes an outer surface (referred to herein as a base outer surface 210, a interface surface 212, a coupling outer surface 214 and a stabilizer outer surface 216, respectively). Additionally, each of the links (i.e., the base link 202, the interface link 203, the one or more coupling links 204, and the stabilizer link 205) includes an inner surface (referred to herein as a base inner surface 218, an interface inner surface 220, a coupling inner surface 222 and a stabilizer inner surface 224, respectively). In combination, when the multi-purpose band 200 is in a band configuration, the base inner surface 218, the interface inner surface 220, the coupling inner surface 222 and the stabilizer inner surface 224 define a passage 230 that extends through the multi-purpose band 200. The passage 230 is sized to fit comfortably over a user's hand or foot so as to facilitate wearing the multi-purpose band 200 on a wrist 300 or ankle of a user. Accordingly, the multi-purpose band 200 may be transported on the wrist 300 or ankle of a user, thereby decreasing undesirable aspects of traveling with auxiliary devices such as a charging-stand.

It is to be understood that the surfaces, particularly the base outer surface 210, the interface surface 212, and the stabilizer outer surface 216, may be relatively flat or may include varying degrees of curvature. At least one charging feature 240 is disposed on the interface link 203, proximate the interface surface 212. It should be appreciated that a charging feature may be any physical structure that operates to facilitate charging of (i.e., a transfer of energy to) a charge-receiving structure such as the portable electronic device 100. A charging feature 240 may be configured to facilitate establishment of a charging relationship between the charging feature and a mating feature, such as an electrical connector, of the portable electronic device 100 so as to facilitate transfer of energy (i.e., electrical or electro-magnetic coupling) between the charging feature 240 and the portable electronic device 100. A charging feature may include electrodes, inductive coils, conductors, electrical connectors, electrically conductive terminals, a wireless power transfer coil for transmission of power to an inductive pad incorporated into a mating smart-phone, and the like. Similar to the plurality of electrical connectors 166 of the rear surface 160 of the portable electronic device 100, it is contemplated that the plurality of charging features 240 extend outwardly away from the interface surface 212 in the form of protrusions or are integrated as recessed regions within the interface surface 212. It is further contemplated that the plurality of charging features 240 comprises a combination of protrusions and recesses. Furthermore, the plurality of charging features 240 may be arranged in numerous alignments. However, it is to be appreciated that the plurality of charging features 240 may be aligned in a relatively angled arrangement, a non-linear arrangement and/or a clustered arrangement. The preceding list of arrangements is merely illustrative of exemplary embodiments and is not intended to be limiting of the particular arrangement of the plurality of charging features 240.

Irrespective of the precise configuration of the plurality of charging features 240, a corresponding relationship is established between the plurality of charging features 240 and the plurality of electrical connectors 166, and engagement of the portable electronic device 100 and the multi-purpose band 200 is facilitated. To ensure proper alignment and orientation between the portable electronic device 100 and the multi-purpose band 200, a portion of the plurality of charging features 240 are formed of a magnetic material.

Engagement between the multi-purpose band 200 and the portable electronic device 100 is facilitated by a magnetic attraction of the plurality of electrical connectors 166 and the plurality of charging features 240. The magnetic material forming the plurality of electrical connectors 166 and the plurality of charging features 240 facilitate an electrical connection between the multi-purpose band 200 and the portable electronic device 100, while maintaining a structural connection in the precise orientation that is desired by a user, i.e., "portrait" or "landscape," as described below. The strength of the magnetic attraction depends on the particular application of use, considering factors such as the weight and geometry of the portable electronic device 100. Generally, the magnetic attraction is greater than the gravitational force of the portable electronic device 100 at the center of gravity of the portable electronic device 100, thereby ensuring maintenance of the center of gravity of the portable electronic device 100 within a perimeter of the portable electronic device 100. Magnetic attachment between the portable electronic device 100 and the multi-purpose band 200 facilitates a readily available attachment and detachment capability that advantageously reduces cumbersome procedures associated with inserting components within mating receptacles. Such an attachment provides greater adaptability of the multi-purpose band 200 to engage a wide variety of portable electronic devices.

As shown in FIGS. 3 and 7, the multi-purpose band 200 is illustrated in a supporting relationship with the portable electronic device 100. In the illustrated embodiments, the base outer surface 210 of the base link 202 and the stabilizer outer surface 216 of the stabilizer link 205 are shown in contact with, and resting upon, a substantially planar, horizontally-oriented surface.

Upon engagement, the multi-purpose band 200 may provide support to position the portable electronic device 100 in a desirable orientation. However, an exemplary embodiment comprising the plurality of charging features 240 provides an electrical connection between the multi-purpose band 200 and the portable electronic device 100. The invention provides that the multi-purpose band 200 acts as an interchangeable element between the charging source and the portable electronic device 100. Therefore, the multi-purpose band 200 provides structural rigidity to the portable electronic device 100, while still facilitating a charge. Such an electrical connection is advantageous if the multi-purpose band 200 is in operable communication with a power source or if a band power storing component 242 is disposed in the multi-purpose band 200. Either configuration provides routing of power to the portable electronic device 100, and more specifically to the power storing component 142 disposed therein. It is to be appreciated that a direct physical connection between the plurality of charging features 240 and the plurality of electrical connectors 166 may facilitate routing of power from the multi-purpose band 200 to the portable electronic device 100. However, it is contemplated that a wireless connection, such as induction may adequately route power to the power storing component 142.

The multi-purpose band 200 is configured to support the portable electronic device 100 in a plurality of orientations. A first orientation is illustrated and corresponds to a relatively vertical orientation of the portable electronic device 100. The relatively vertical orientation may be referred to as a "portrait" orientation. As shown and discussed in detail above, the interface surface 212 engages the rear surface 160 of the portable electronic device 100, while at least a portion of the base outer surface 210 of the base link 202 rests upon a horizontal surface. To provide a desired orientation of the portable electronic device 100, the interface surface 212 of the interface link 203, is formed as a substantially flat surface. In a stand configuration, the interface surface 212 is disposed at an angle from vertical so as to define the angular orientation of the portable electronic device 100. This feature may take the form of various other embodiments by varying the angles to achieve a desired portrait orientation to provide a desired orientation.

It should be appreciated that portable electronic device 100 may be disposed in a substantially horizontal orientation, which may be referred to as a "landscape" orientation. Accordingly, the portable electronic device 100 would be rotated 90 degrees to re-orient the portable electronic device 100 from the portrait orientation to the landscape orientation. The angling of the interface surface 212 allows the multi-purpose band 200 to provide a reliable support of the portable electronic device 100 subsequent to such a re-orienting of the portable electronic device 100 to the landscape orientation from the portrait orientation.

As can be appreciated, the described and illustrated embodiments provide numerous alternative orientations that may be achieved by manipulation of the multi-purpose band 200 and the portable electronic device 100. Additionally, it is contemplated that the geometry of the multi-purpose band 200 may be modified to provide alternative orientations. It is to be understood that the multi-purpose band 200 provides a plurality of orientations in which the portable electronic device 100 may be situated. The plurality of orientations allows a user to selectively determine a desirable orientation of the portable electronic device 100, which typically varies from use-to-use of the portable electronic device 100.

Referring now to FIG. 7, the multi-purpose band 200 includes a power source port 280, which is shown as a blind bore, configured to receive a wired power source, such as a power cord 282. In the illustrated embodiment, the power source port 280 is disposed within a coupling link 204, however it is to be appreciated that the power source port 280 may be disposed within any one of the base link 202, the interface link 203, the stabilizer link 205, a coupling link 204, or the stabilizer 219. One or more electrical connections (not illustrated) extend from the power source port 280 to the plurality of charging features 240, thereby routing power to the externally exposed plurality of charging features 240.

In an exemplary embodiment, a multi-purpose band 200 facilitates wireless transmission of information between the multi-purpose band 200 and the portable electronic device 100. In addition, a multi-purpose band 200 includes a wireless power transfer coil for transmission of power to an inductive pad incorporated into a mating smart-phone (e.g., Q1 wireless charging-standard), thereby facilitating facilitates wireless charging of a portable electronic device 100. Still further, a multi-purpose band 200 facilitates transformation into a plurality of configurations including a stand configuration and a band configuration.

In an exemplary embodiment, a multi-purpose band 200 comprises six or seven links that may be configured by the user as a bracelet or as a charging-stand. In an exemplary embodiment, a multi-purpose band 200 includes a USB interface for attaching a power source to an end of one of the links (i.e., to the base link 202, the interface link 203), the coupling link 204, or the stabilizer link 205) for providing power to the multi-purpose band 200. In an exemplary embodiment, a multi-purpose band 200 includes a power transfer coil for wireless charging of a nearby device (e.g., according to a Q1 charging standard, providing for charging at distances ranging to 40 mm).

In an exemplary embodiment, a multi-purpose band 200 is configured to perform multiple functions including: (a) serving as a wrist-mountable interface for a portable electronic device 100; (b) serving as a charging-stand for a portable electronic device 100; and/or (c) serving as a wristband/bracelet/wristwatch. To facilitate serving as a wrist-mountable interface for a portable electronic device 100, a multi-purpose band 200 may be configured to provide a display for viewing information received from the portable electronic device 100 via a wireless connection. Thus, the multi-purpose band 200 may be worn as a watch or bracelet while providing a display of information accessed via the wireless connection.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A multi-purpose band for use with a portable electronic device comprising:
    a base portion, an interface portion, and a coupling portion, the base portion being joined to the interface portion by an interface supporting hinge portion, the coupling portion being joined among the base portion, and the interface portion;
    the multi-purpose band being configured to be arranged in a band configuration, for wearing on a wrist or ankle of a user, and in a stand configuration for supporting the portable electronic device at a support angle, the support angle being defined between the base portion and the interface portion;
    the interface portion defining an interface surface;
    the base portion defining a base inner surface, the interface portion defining an interface inner surface, and the coupling portion defining a coupling inner surface;
    the base inner surface, the interface inner surface, and the coupling inner surface defining, when arranged in the band configuration, a passage that extends through the multi-purpose band, the passage being sized to facilitate wearing the multi-purpose band on the wrist or ankle; and a charging feature disposed on the interface portion proximate the interface surface, the charging feature configured to establish a charging relationship between the charging feature and an electrical connector of the portable electronic device to facilitate an engagement between the charging feature and the electrical connector.

2. A multi-purpose band as in claim 1, wherein the charging feature comprises a material configured to facilitate an engagement between the multi-purpose band and the portable electronic device.

3. A multi-purpose band as in claim 1, further comprising a band power storing component disposed in at least one of the base portion, the interface portion, or the coupling portion, wherein the band power component stores power for charging a battery in the portable electronic device.

4. A multi-purpose band as in claim 1, further comprising a power source port configured to receive a wired power source, wherein:
the power source port is disposed within the coupling link, the base link, or the interface link; and
an electrical connection extends from the power source port to the charging feature.

5. A multi-purpose band as in claim 1, wherein the charging feature is configured to route power to the portable electronic device through a direct physical connection between the charging feature and at least one of the electrical connector or an auxiliary power source.

6. A multi-purpose band as in claim 1, wherein the charging feature is configured to route power to the portable electronic device through a wireless connection.

7. A multi-purpose band as in claim 6, wherein the charging feature comprises a wireless power transfer coil for transmission of power to an inductive pad of the portable electronic device.

8. A multi-purpose band as in claim 1, further comprising a communication subsystem configured for wirelessly communicating with the portable electronic device.

9. A multi-purpose band as in claim 1, wherein the interface supporting hinge portion defines the support angle between the base portion and the interface portion and support for the interface portion is provided at the support angle when the multi-purpose band is in the stand configuration.

10. A multi-purpose band as in claim 1, wherein the coupling portion is disposed as a kickstand so as to define the support angle between the base portion and the interface portion and support for the interface portion is provided at the support angle when the multi-purpose band is arranged in the stand configuration.

11. A multi-purpose band as in claim 1, wherein each of the base portion, the interface portion, and the coupling portion defines two edges, each of said two edges being joined, by a hinged connector, to an edge of another base portion, interface portion, stabilizer portion or coupling portion, and wherein the multi-purpose band is configured to be re-arranged from the band configuration to the stand configuration.

12. A multi-purpose band as in claim 1, wherein:
the base portion is joined, by a first interface support hinge, to the coupling portion;
the coupling portion is joined, by a second interface support hinge, to the interface portion; and
the first interface support hinge and the second interface support hinge, together, define the support angle, at which the interface portion is disposed.

13. A multi-purpose band as in claim 1, further comprising a stabilizer disposed so as to extend from the base portion in a direction substantially parallel to the base portion when the multi-purpose band is in the stand configuration.

14. A multi-purpose band as in claim 13, wherein the stabilizer is configured to be retracted when the multi-purpose band is in the band configuration.

15. A multi-purpose band as in claim 13, wherein the stabilizer is configured to slide into a cavity defined by the base portion when the multi-purpose band is in the band configuration.

16. A multi-purpose band as in claim 13, wherein the stabilizer is configured to occupy a retracted position aligned with, and along a side of, the base portion when the multi-purpose band is in the band configuration.

17. A multi-purpose band as in claim 1, wherein the support angle is deviated from vertical.

18. A portable electronic device comprising:
a multi-purpose band configurable in at least a band configuration and a stand configuration, wherein the band configuration supports wearing the portable electronic device on a wrist or ankle, wherein the stand configuration supports the portable electronic device at one or more viewing angles desired by a user of the portable electronic device, the one or more viewing angles being defined between a base portion and an interface portion of the multi-purpose band; and
a charging component integrated with the interface portion of the multi-purpose band, wherein the charging component is configured to establish a charging relationship with an electrical connector of the portable electronic device such that when established, an engagement between the charging component and the electrical connector facilitates the charging component in charging the portable electronic device,
wherein the multi-purpose band includes at least one coupling portion joined among the base and interface portions, and when the multi-purpose band is arranged in the band configuration, the base portion, the interface portion, and the at least one coupling portion define a passage extending through the multi-purpose band, the passage being sized to facilitate wearing the multi-purpose band on the wrist or ankle.

19. The portable electronic device of claim 18, further comprising a connector configured to selectively attach and detach the portable electronic device to and from the multi-purpose band, wherein the portable electronic device is a smartphone or a smartwatch.

20. The portable electronic device of claim 18, further comprising a power storage component disposed in the multi-purpose band, wherein the power storage component is configured to deliver power through the charging component to charge a battery of the portable electronic device, and wherein the power storage component is configured to be recharged wirelessly and/or via a wired power source.

* * * * *